July 4, 1967   D. L. ANDERSON   3,329,958
ARTIFICIAL DIELECTRIC LENS STRUCTURE
Filed June 11, 1964   2 Sheets-Sheet 1

INVENTOR.
DONALD L. ANDERSON
BY *John F. Lawler*
ATTORNEY

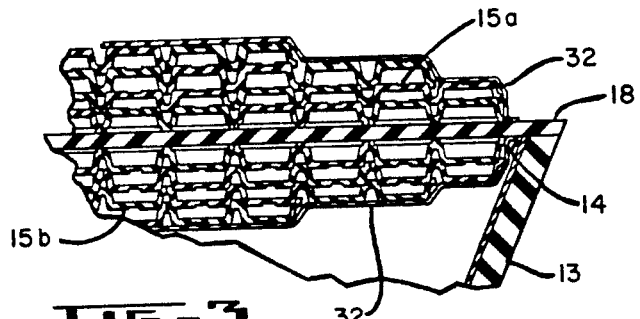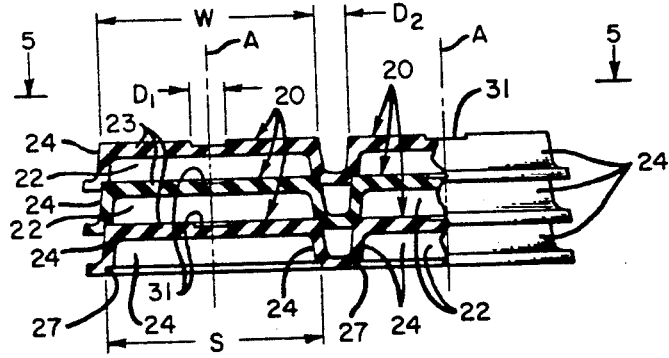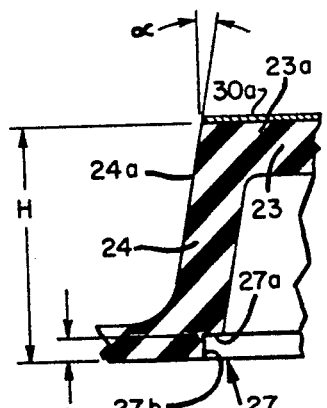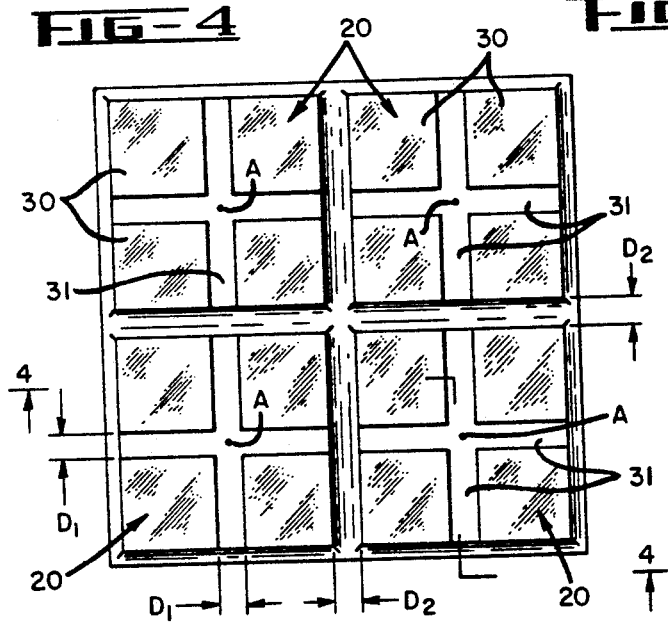

United States Patent Office 3,329,958
Patented July 4, 1967

1

3,329,958
ARTIFICIAL DIELECTRIC LENS STRUCTURE
Donald L. Anderson, Cupertino, Calif., assignor to Sylvania Electric Products Inc., a corporation of Delaware
Filed June 11, 1964, Ser. No. 374,521
7 Claims. (Cl. 343—753)

This invention relates to electromagnetic wave lenses, and more particularly to an artificial dielectric lens useful in a horn antenna.

The length of a horn antenna of the type described in copending application Ser. No. 359,874 assigned to the assignee of this invention, may be shortened considerably by use of an electromagnetic wave lens in its aperture. A low frequency ridged horn of this type operating over a frequency range of 50 to 500 megacycles has an aperture with a diameter of 12 feet and requires an asymmetrically shaped lens because of the horn ridges. The fabrication of this lens from natural dielectric necessitates a precise machining operation that is costly and time-consuming. Moreover, a natural dielectric lens of this size is quite heavy and would compromise the weight limitations of the horn and the arrays in which they are used. Also, a large one-piece lens is fragile and is susceptible to damage during shipment and handling.

An object of this invention is the provision of a lightweight electromagnetic wave lens.

Another object is the provision of such a lens that may be quickly fabricated without use of machine tools or skilled craftsmen.

Still another object is the provision of a lightweight modular artificial dielectric lens.

A more specific object is the provision of a modular lens structure with artificial dielectric modules that readily interlock with each other when stacked in the direction of wave propagation.

In accordance with the invention, an electromagnetic wave lens is formed with a plurality of interlocking expanded-plastic dish-shaped modules stacked upon one another to a calculated height (i.e., lens thickness) which varies over the lens area to produce the desired index of refraction. The modules are substantially identical. Each module is symmetrical about its axis and has an electrically-conductive surface spaced from the corresponding surface on the adjacently stacked module by a fixed distance determined by the module height less the nesting depth. The nested parts of interlocked modules have (1) abutting surfaces which precisely and equally limit nesting depths, and (2) frictionally engaging surfaces which lock the modules together, i.e., prevent relative lateral movement of the modules and resist separation of the modules in the direction of nesting. Because of its foamed plastic modular construction, the lens is extremely lightweight, is less vulnerable to damage from shock, and is readily repairable in event damage does occur. The lens is fabricated simply by stacking the modules similar to building blocks. The numbers of conductive strips required for the desired index of refraction determine the stack heights. Accordingly, a lens with a complex refraction characteristic is readily fabricated without a skilled craftsman or special machinery.

These and other objects of the invention will become apparent from the following description of a preferred embodiment thereof, reference being had to the accompanying drawings in which:

FIGURE 1 is an elevation of a ridged horn antenna having a lens embodying the invention;

2

FIGURE 3 is an enlarged section taken on line 3—3 of FIGURE 2;

FIGURES 4 and 4A are greatly enlarged portions of FIGURE 3 showing the structure of the lens modules; and FIGURE 5 is a plan view of a cluster of modules as viewed on line 5—5 of FIGURE 4.

Figure 1:
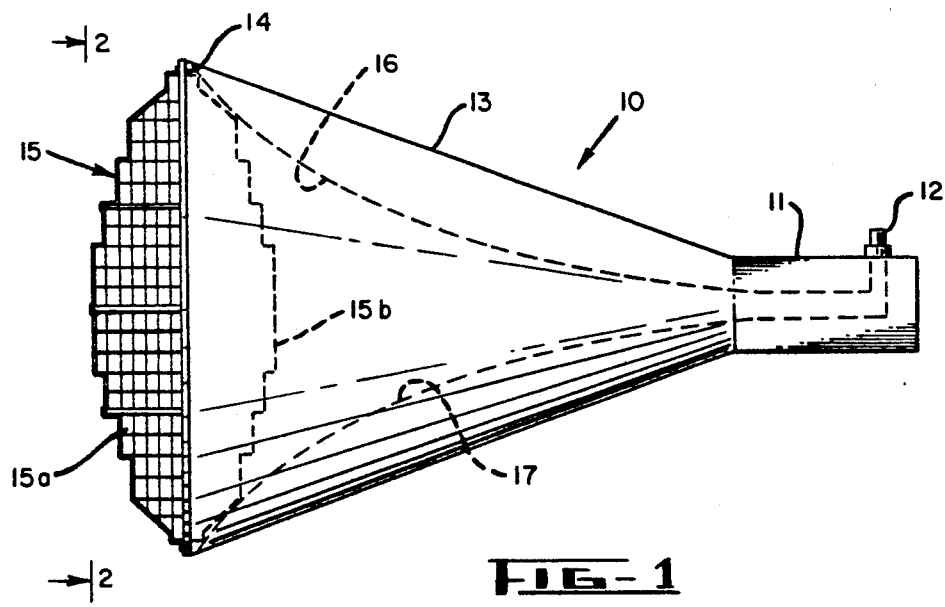
Figure 2:
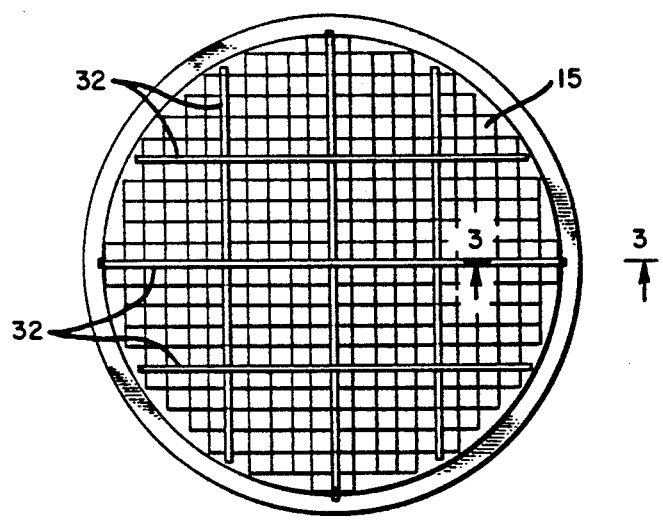
FIGURE 2 is a front view of the horn as viewed on line 2—2 of FIGURE 1 showing the lens in plan.

Referring now to the drawings, FIGURE 1 shows a horn antenna 10 having a waveguide section 11 to which an external feed line 12 is coupled, and a forward flared section 13 with a circular aperture 14 within which a lens 15 embodying the invention is mounted. The horn may be a ridged type with longitudinally extending internal ridges 16 and 17 for broadband operation; while the lens 15 may be used for other applications requiring phase correction, its utility, advantage, and versatility are particularly well demonstrated with a ridged horn antenna.

Lens 15 preferably is a double convex type and is formed with two half-sections 15a and 15b secured to opposite sides of a dielectric plate 18 (see FIGURE 3) mounted on the face of the horn. Each half lens comprises a plurality of identical dished modules 20, see FIGURES 4, 5 and 6, each module being symmetrical about its axis A and being illustrated and described herein as having a square plan profile although other profiles may be used. For example, the modules may have circular or polygonal or other shapes of plan profiles provided each module is symmetrical about its axis.

Each of the square modules 20, see FIGURES 4 and 5, has a cavity 22 defined by a transverse wall 23 and four identical side walls 24. The module walls are composed of low density foamed plastic material such as expanded polystyrene beads molded in accordance with well-known processes either separately or in a symmetrical cluster comprising several modules such as the four modules shown in FIGURE 5.

The inside edge of each module side wall remote from transverse wall 23 is formed with an angle-shaped seat 27, see FIGURES 4 and 4A, defined by flat surfaces 27a and 27b which extend the length of the side wall; surface 27a is generally parallel to outer surface 23a of the transverse wall 23, and the plane of surface 27b is so angularly related to the plane of the outer surface 24a of the side wall that surface 27b frictionally engages the side wall of a nested module when bottomed in the seat. Preferably, side wall surface 24a has a slight taper indicated by the angle α, the angle of seat 27 is 90 degrees, and the dimension S (see FIGURE 4) between seat surfaces 27b in opposite side walls is equal to the width W of wall 23.

The outer surface 23a of transverse wall 23 of each module is divided into laterally-spaced symmetrically arranged sections 30, see FIGURE 5, coated with a thin conductive film 30a, such as flame-sprayed tin; the metallized sections constitute the conductive strips of the artificial dielectric structure. The lateral space $D_1$ between the sections 30 on each module is equal to the spacing $D_2$ between adjacent modules at surfaces 23 thereof. In a preferred form of the invention, the modules are molded with unmetallized sections separated by shallow recesses 31; this construction facilitates the making of metallized sections 30 as described below. Care is taken to select a conductive material that will not react adversely with the foamed plastic composition. The axial spacing between sections of conductive strips 30 on adjacently stacked modules is equal to the module height H less the nesting depth N of seat 27.

Lens 15 is basically a metallic delay lens made of an artificial dielectric which employs the conducting strips 30 in a three-dimensional lattice structure. The strips are small compared to the wavelength. The dimensions of such a lens structure, particularly the dimension in the direction of radio wave propagation therethrough, determine the index of refraction and phase correction of the waves. The principle of artificial dielectrics is well known and has been employed in various microwave devices such as a broadband quarterwave plate described in Patent No. 2,921,312 of Arthur F. Wickersham, Jr.

A lens having the desired index of refraction is constructed by stacking modules 20 one upon the other over the lens area to a depth (lens thickness) which varies to provide a predetermined density and distribution of conductive strips 30. The half-lens parts 15a and 15b are constructed separately and are secured to opposite sides of dielectric plate 18 which gives the structure additional rigidity and facilitates mounting of the lens in the horn aperture. Prior to stacking of the modules, the conductive strips 30 are formed by metallizing the transverse wall 23 of the modules 20 in clusters of four as shown in FIGURE 5. In order to control the area of each strip 30 and to provide a predetermined equal spacing between laterally adjacent strips, a lattice-shaped mask (not shown) is laid against the surfaces 23 of the clustered modules and metal is applied by the flame spraying process to a thickness of approximately 0.010 inch. The mask has a width equal to the dimension $D_1$ or $D_2$ and fits into and covers the recesses 31 and the spaces between adjacent modules. The modules are then ready for placement to make the lens structure.

With dielectric plate 18 disposed horizontally on a work table, the modular units are placed adjacent to each other and are cemented open face down to the surface of the plate to form the first layer in somewhat the manner of laying floor tiles. The next layer of modules is formed by interlocking the open faces of the modules with the upper parts of the first layer of modules; the interlocking is effected by seating of the upper parts of the first layer modules into the seats 27 of the second layer modules. If desired, successive layers of modules may be adhesively bonded together by applying to the seats of the modules prior to nesting a suitable cement that is impervious to electromagnetic waves. As successive layers of modules are added, the outline or plan of each layer is changed in accordance with a predetermined pattern in order to achieve a desired distribution of the conductive strips in the layer; the lens fabricator merely sets the modules in any one layer according to a plan drawing for that layer. The fabrication of a three dimensional lens structure with a complex distribution of conductive strips is thus simplified by the modular layer by layer construction and asymmetrical lenses of the type required for rigid horn antennas are readily assembled. Individual modules may be readily separated from the clusters by breaking or cutting the wall between modules and further subdivision of each module provides even fewer numbers of conductive strips as required.

The other half-lens is constructed in the same manner except that a dielectric plate 18 need not be used. After completion, this half-lens is cemented to the side of plate 18 opposite from the other half-lens to complete the double convex structure.

The stacked modules comprising each half-lens structure may be reinforced by Fiberglas straps 32 criss-crossed over and cemented to the outer surfaces of the modules and to plate 18. In addition, the exposed outer surface of lens half 15a may be coated with an epoxy paint to seal the expanded plastic modules and to protect the lens from the elements and damage from other causes.

A double convex lens embodying the invention and fabricated for and successively used with the aforementioned horn antenna include 1,442 modules, weighed approximately 300 pounds and was constructed in less than 200 man-hours of time. The modules were formed from expanded polystyrene beads, had a width of 6⅛ inches, a height H of 1⅜ inches, a nesting depth N of 3/16 inch, and conductive strips 30 that were 2¾ inches square.

Although the invention has been described in connection with certain embodiments, it is to be understood that the invention is not to be limited to the described embodiments. The scope of the invention is defined in the appended claims.

What is claimed is:

1. An artificial dielectric structure having a predetermined refraction characteristic for electromagnetic waves at given frequencies comprising,
   a plurality of stacked layers of substantially identical dielectric modules,
      each module having a transverse wall and depending side walls,
      said side walls having seats adapted to receive the transverse wall of an adjacently stacked module to establish a predetermined spacing between the transverse walls of said stacked modules,
      said transverse walls having at least portions thereof coated with an electrically conductive material to form conductive strips,
   said modules being stacked to predetermined heights over the area of the structure whereby to provide a predetermined distribution of said strips corresponding to said refraction characteristic.

2. An artifical dielectric structure having a predetermined refraction characteristic for electromagnetic waves at given frequencies comprising,
   a plurality of stacked layers of substantially identical foamed-plastic modules,
      each module having an axis and a wall transverse to said axis and side walls depending from the transverse wall,
      said walls being symmetrical about said axis,
      said side walls having seats adapted to receive the transverse wall of an adjacently stacked module to establish a predetermined constant spacing between the transverse walls of said stacked modules,
      said transverse walls having equally laterally spaced thin electrically conductive strips thereon,
   said modules being stacked to predetermined heights over the area of the structure whereby to provide a distribution of said strips corresponding to said refraction characteristic.

3. The structure according to claim 2 with a plurality of said strips on the transverse wall of each module, said strips having the same size and shape and being disposed symmetrically of said module axis.

4. The structure according to claim 3 in which said modules and said strips are square.

5. An artificial dielectric having a predetermined refraction characteristic for electromagnetic waves at givein frequencies comprising,
   a plurality of stacked mechanically interlocked layers of identical dished foamed-plastic modules with a plurality of modules in each layer,
      each module having a wall transverse to the direction of wave propagation and a plurality of substantially identical electrically conductive strips on said wall.

6. The artificial dielectric according to claim 5 in which the number of modules in the stacked layers varies over the height of the stack whereby to provide the distribution and density of said strips corresponding to a predetermined refraction characteristic for said artificial dielectric.

7. In combination, a horn antenna having an aperture, a metallic delay lens mounted on the horn at its aperture,
  said lens comprising a plurality of layers of identical dished dielectric modules with each module in one row nested and mechanically interlocked with modules in the adjacent rows and having portions thereof spaced from corresponding portions of the modules interlocked therewith, and metallic strips formed in parallel equally spaced planes on said portions of the modules.

References Cited

UNITED STATES PATENTS

| | | | |
|---|---|---|---|
| 2,588,610 | 3/1952 | Boothroyd et al. | 343—753 |
| 3,099,836 | 7/1963 | Carr | 343—753 |
| 3,128,467 | 4/1964 | Lanctot | 343—785 X |
| 3,254,345 | 5/1966 | Hannan | 343—911 |
| 3,267,480 | 8/1966 | Lerner | 343—911 |

ELI LIEBERMAN, *Primary Examiner.*

HERMAN KARL SAALBACH, *Examiner.*